US012315978B2

(12) United States Patent
Qiao et al.

(10) Patent No.: US 12,315,978 B2
(45) Date of Patent: May 27, 2025

(54) DIELECTRIC FILTER AND COMMUNICATION DEVICE

(71) Applicant: Huawei Technologies Co., Ltd., Shenzhen (CN)

(72) Inventors: Dongchun Qiao, Yokohama (JP); Fanghai Xu, Shenzhen (CN); Jing Shi, Shanghai (CN); Xiaoliang Du, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/709,085

(22) Filed: Mar. 30, 2022

(65) Prior Publication Data

US 2022/0223989 A1 Jul. 14, 2022

Related U.S. Application Data

(63) Continuation of application No. PCT/CN2019/109711, filed on Sep. 30, 2019.

(51) Int. Cl.

| | |
|---|---|
| ***H01P 1/208*** | (2006.01) |
| ***H01P 1/20*** | (2006.01) |
| ***H01P 1/205*** | (2006.01) |

(52) U.S. Cl.

CPC .......... *H01P 1/2002* (2013.01); *H01P 1/2056* (2013.01); *H01P 1/208* (2013.01)

(58) Field of Classification Search

CPC ........ H01P 1/2002; H01P 1/2088; H01P 1/20; H01P 1/201; H01P 1/207; H01P 1/208; H01P 1/2056; H01P 3/16

See application file for complete search history.

(56) References Cited

U.S. PATENT DOCUMENTS

| | | | |
|---|---|---|---|
| 4,800,347 | A | 1/1989 | Yorita et al. |
| 2002/0097113 | A1 | 7/2002 | Okada et al. |

FOREIGN PATENT DOCUMENTS

| | | | |
|---|---|---|---|
| CN | 1367549 | A | 9/2002 |
| CN | 1399367 | A | 2/2003 |
| CN | 106450603 | A | 2/2017 |
| CN | 109546270 | A | 3/2019 |
| CN | 109786902 | A | 5/2019 |
| CN | 110048200 | A | 7/2019 |
| CN | 110098456 | A | 8/2019 |
| CN | 110137638 | A | 8/2019 |
| CN | 110148819 | A | 8/2019 |
| CN | 110224205 | A | 9/2019 |
| IN | 110277612 | A | 9/2019 |
| JP | H01220502 | A | 9/1989 |
| JP | H04103202 | A | 4/1992 |

(Continued)

*Primary Examiner* — Stephen E. Jones

(74) *Attorney, Agent, or Firm* — Leydig, Voit & Mayer, Ltd.

(57) ABSTRACT

Embodiments of this application provide a dielectric filter and a communication device. The dielectric filter includes: a dielectric body, a first blind via and a second blind via that are provided in the dielectric body, a through hole located between the first blind via and the second blind via, and an insulating portion, where inner walls of the first blind via, the second blind via, and the through hole each are covered with a metal layer, and an outer surface of the dielectric body is covered with a metal layer; and the insulating portion is implemented by not covering a metal layer on a surface of the dielectric body, and the insulating portion partially surrounds the through hole.

5 Claims, 9 Drawing Sheets

(56) References Cited

FOREIGN PATENT DOCUMENTS

| | | | |
|---|---|---|---|
| JP | H07135405 | A | 5/1995 |
| JP | H0818306 | B2 | 2/1996 |
| JP | 2002290108 | A | 10/2002 |
| WO | 2014190536 | A1 | 12/2014 |

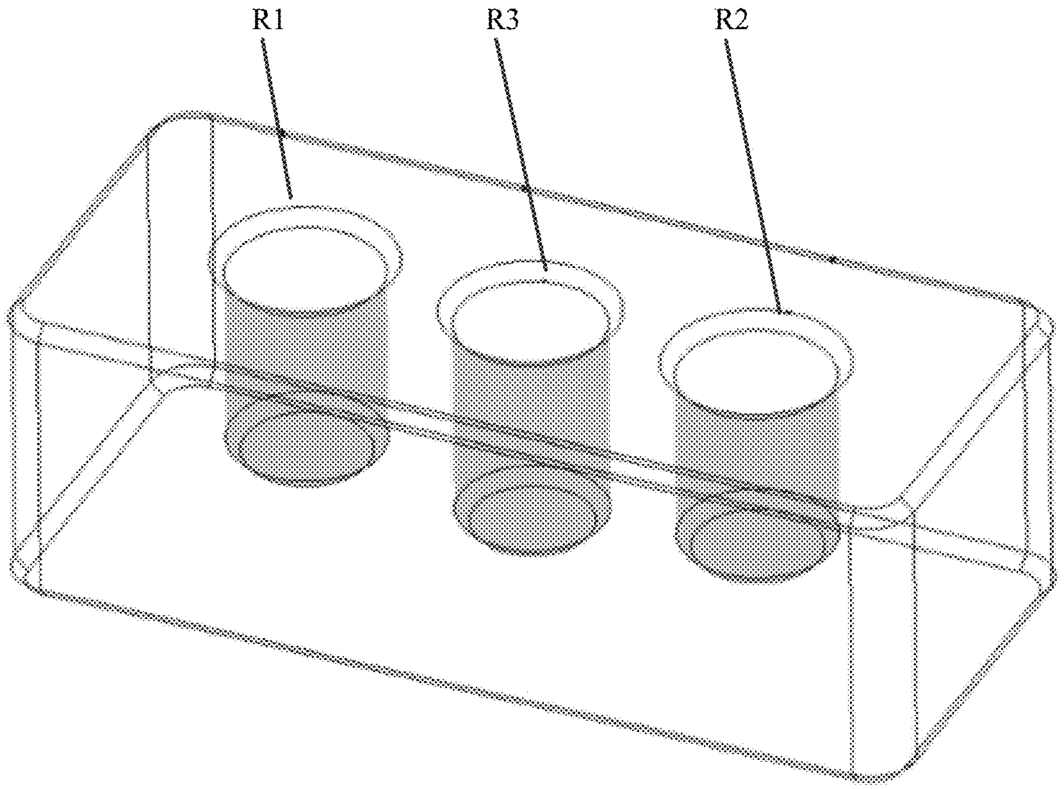
Prior Art FIG. 1
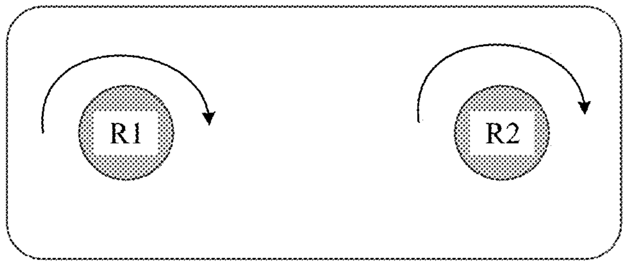
Prior Art FIG. 2

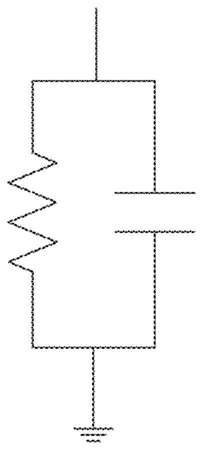
Prior Art FIG. 3
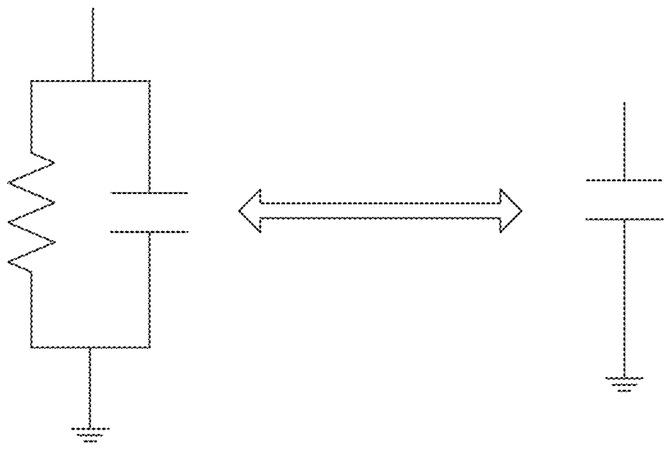
Prior Art FIG. 4
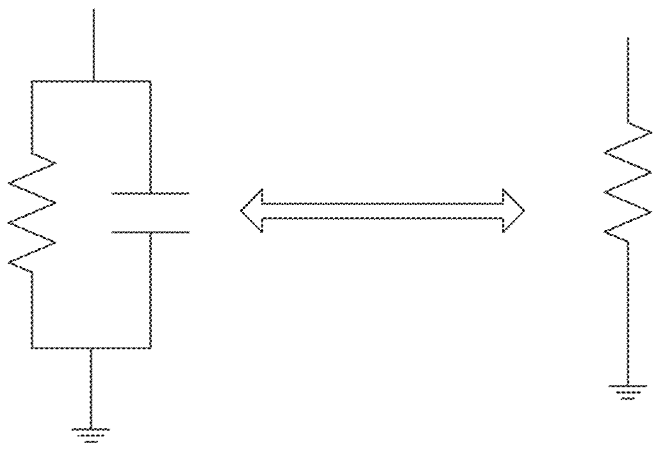
Prior Art FIG. 5

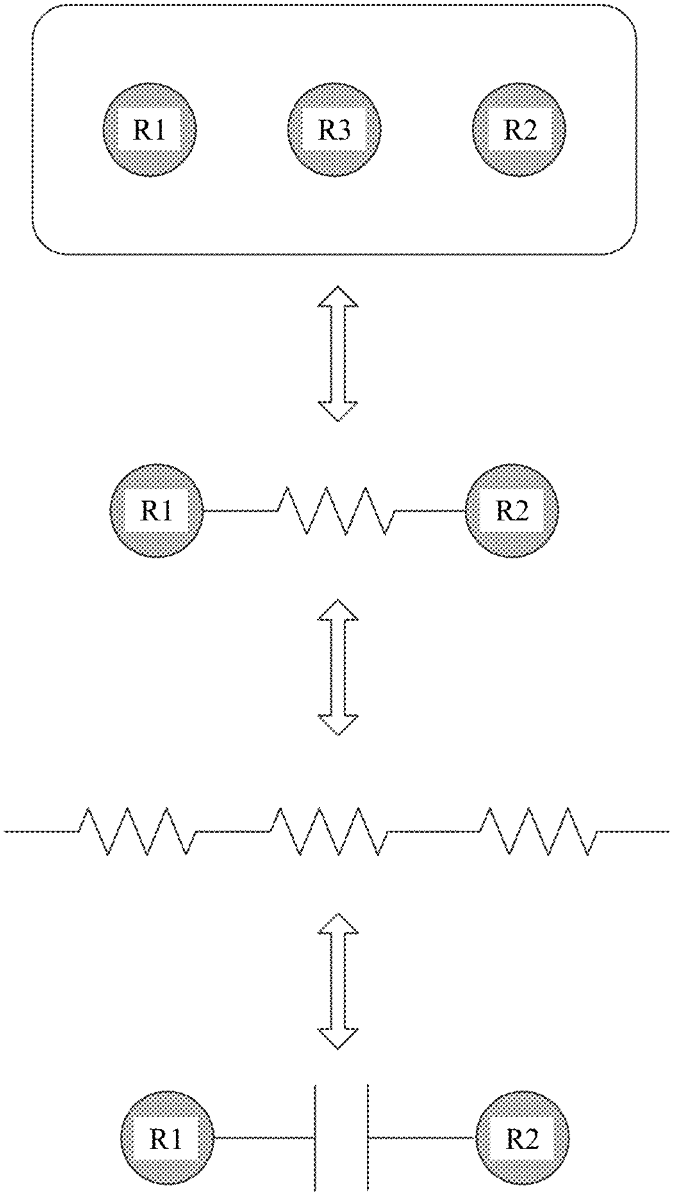
Prior Art FIG. 6

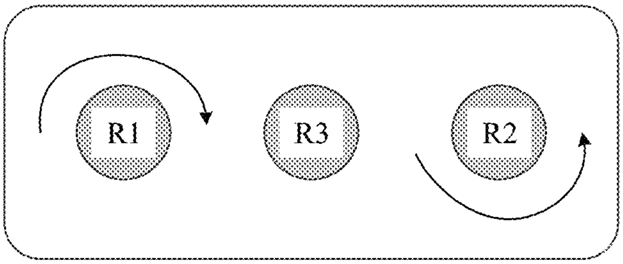
Prior Art FIG. 7
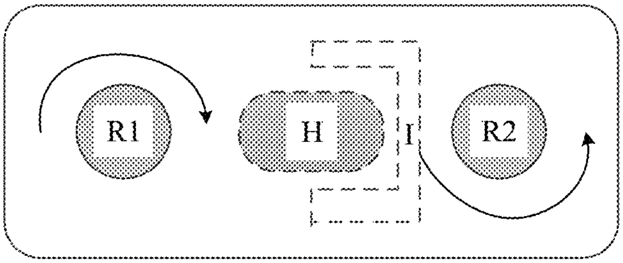
FIG. 8
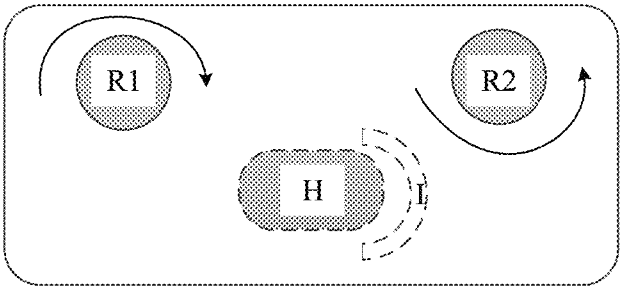
FIG. 9

DIELECTRIC FILTER AND COMMUNICATION DEVICE

CROSS-REFERENCE TO RELATED APPLICATIONS

This application is a continuation of International Application No. PCT/CN2019/109711, filed on Sep. 30, 2019, which is hereby incorporated by reference in its entirety.

TECHNICAL FIELD

Embodiments of this application relate to communication technologies, and in particular, to a dielectric filter and a communication device.

BACKGROUND

In modern mobile communication technology, a radio frequency component has become an indispensable part of a communication device. Correspondingly, as a basic radio frequency unit, a filter may filter signals of some specific frequencies to obtain a target signal. Because a dielectric filter is a high-Q ceramic dielectric filter, has advantages of low-insertion loss, high suppression, high intermodulation, and low temperature drift compared with a conventional metal filter. Therefore, the dielectric filter is widely used in various communication devices.

FIG. 1 is a schematic diagram of a structure of a dielectric filter according to a conventional technology. As shown in FIG. 1, the existing dielectric filter uses a dielectric material (for example, ceramics) as a dielectric body, and the dielectric body is provided with three blind vias R1, R2, and R3. R1 and R2 are referred to as resonant cavities, which are equivalent to resonators of the filter. R3 between R1 and R2 is referred to as a coupling cavity. A resonance frequency of R3 is lower than resonance frequencies of R1 and R2, so that an electric coupling between the resonators R1 and R2 can be implemented by using a polarity reversal principle.

In the conventional technology, such a manner of implementing the electric coupling between R1 and R2 generates a parasitic resonance effect, and further affects low band suppression of a passband.

SUMMARY

Embodiments of this application provide a dielectric filter and a communication device, to reduce modeling processing complexity. Moreover, a coupling manner of the dielectric filter does not have a parasitic resonance effect and does not affect low band suppression.

According to a first aspect, an embodiment of this application provides a dielectric filter. The dielectric filter may be applied to a communication device to filter a signal wave. The dielectric filter includes: a dielectric body, a first blind via and a second blind via that are provided in the dielectric body, a through hole located between the first blind via and the second blind via, and an insulating portion, where inner walls of the first blind via, the second blind via, and the through hole each are covered with a metal layer, and an outer surface of the dielectric body is covered with a metal layer; and the insulating portion is implemented by not covering a metal layer on a surface of the dielectric body, and the insulating portion partially surrounds the through hole.

In the dielectric filter in this embodiment of this application, because a through hole is provided between the first blind via and the second blind via and the insulating portion partially surrounds the through hole, when a signal wave entering the first blind via passes through the through hole, a phase of the signal wave negatively shifts for 90 degrees, and the signal wave is transmitted to the second blind via, so that an electric coupling of the dielectric filter is implemented. In addition, in such a manner of implementing the electric coupling, because a through hole is provided between the first blind via and the second blind via, modeling processing complexity is reduced. Moreover, such an electric coupling manner does not have a parasitic resonance effect and does not affect low band suppression.

In a possible design, an opening of the first blind via, an opening of the second blind via, and a first opening of the through hole are all provided on a first plane of the dielectric body, a second opening of the through hole is provided on a second plane of the dielectric body, and the first plane and the second plane are disposed oppositely.

Such an arrangement manner can facilitate modeling processing of the dielectric filter, facilitate arrangement of the insulating portion, and facilitate a plurality of implementations of the through hole.

Corresponding to the arrangement manners of the opening of the first blind via and the opening of the second blind via, the following describes arrangement manners of the through hole and the insulating portion in this embodiment of this application.

In a possible design, the through hole includes a first through hole portion and a second through hole portion that are communicated, and an aperture of the first through hole portion is less than an aperture of the second through hole portion; and a first opening of the first through hole portion is the first opening of the through hole, a second opening of the second through hole portion is the second opening of the through hole, the first through hole portion is communicated with the second through hole portion through a second opening of the first through hole portion and a first opening of the second through hole portion, the first opening of the through hole is provided on the first plane of the dielectric body, the second opening of the through hole is provided on the second plane of the dielectric body, and the first plane and the second plane are disposed oppositely.

In a possible design, a projection of the first opening of the first through hole portion on the second plane is at a central position of the second opening of the second through hole portion, or a projection of the first opening of the first through hole portion on the second plane is at a non-central position of the second opening of the second through hole portion.

In a possible design, the insulating portion partially surrounds the second through hole portion.

In this design, the insulating portion is provided on the second plane and partially surrounds the second opening of the second through hole portion.

In this design there is a distance between the insulating portion and the second through hole portion, or an edge of the insulating portion coincides with an edge of the second through hole portion.

In a possible design, the insulating portion is provided on an inner wall of the second through hole portion.

It should be understood that regardless of relative positions of the first through hole portion and the second through hole portion and arrangement of the insulating portion, the insulating portion needs to surround the projection of the first opening of the first through hole portion on the second plane to implement the electric coupling.

In a possible design, there are at least two second through hole portions, and apertures of the second through hole portions sequentially increase in a direction away from the first through hole portion.

In this design, the insulating portion is provided on the second plane, and the insulating portion partially surrounds a second through hole portion with a largest aperture.

In this design, the insulating portion is provided on an inner wall of any second through hole portion.

In this design, there may be a plurality of insulating portions, each insulating portion partially surrounds one second through hole portion, and the insulating portion may be provided on an inner wall of the second through hole portion.

In a possible design, the first through hole portion is cylindrical, and the second through hole portion is elongated.

In a possible design, the dielectric body is ceramic.

According to a second aspect, an embodiment of this application further provides a communication device. The communication device includes the dielectric filter according to the first aspect. The communication device provided in this embodiment of this application can implement the same technical effect as the dielectric filter. For details, refer to the related description of the foregoing embodiment.

The embodiments of this application provide a dielectric filter and a communication device. The dielectric filter includes: a dielectric body, a first blind via and a second blind via that are provided in the dielectric body, a through hole located between the first blind via and the second blind via, and an insulating portion, where inner walls of the first blind via, the second blind via, and the through hole each are covered with a metal layer, and an outer surface of the dielectric body is covered with a metal layer; and the insulating portion is implemented by not covering a metal layer on a surface of the dielectric body, and the insulating portion partially surrounds the through hole. In the dielectric filter in this embodiment of this application, because a through hole is provided between the first blind via and the second blind via and the insulating portion partially surrounds the through hole, when a signal wave entering the first blind via passes through the through hole, a phase of the signal wave negatively shifts for 90 degrees, and the signal wave is transmitted to the second blind via, so that an electric coupling of the dielectric filter is implemented. In addition, in such a manner of implementing the electric coupling, because a through hole is provided between the first blind via and the second blind via, modeling processing complexity is reduced. Moreover, such an electric coupling manner does not have a parasitic resonance effect and does not affect low band suppression.

BRIEF DESCRIPTION OF DRAWINGS

FIG. 1 is a schematic diagram of a structure of a dielectric filter according to a conventional technology;

FIG. 2 is a schematic diagram of a principle reference of a filter;

FIG. 3 is an equivalent circuit diagram showing that R3 is disposed between R1 and R2 shown in FIG. 1;

FIG. 4 is an equivalent circuit diagram showing that a resonance frequency of R3 is greater than resonance frequencies of R1 and R2;

FIG. 5 is an equivalent circuit diagram showing that a resonance frequency of R3 is less than resonance frequencies of R1 and R2;

FIG. 6 is an equivalent circuit diagram corresponding to FIG. 1;

FIG. 7 is a top view of the dielectric filter corresponding to FIG. 1;

FIG. 8 is a first top view of a dielectric filter according to an embodiment of this application;

FIG. 9 is a second top view of a dielectric filter according to an embodiment of this application;

DESCRIPTION OF EMBODIMENTS

Figure 10:
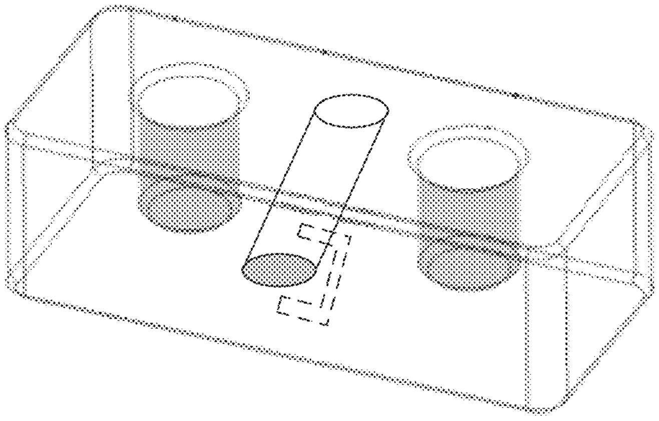
FIG. 10 is a first schematic diagram of a structure of a dielectric filter according to an embodiment of this application.

To better understand a dielectric filter provided in embodiments of this application, the following describes in detail a structure and a principle of a filter in a conventional technology.

FIG. 2 is a schematic diagram of a principle reference of a filter. FIG. 2 is a top view of a dielectric body provided with two blind vias R1 and R2. A depth of a blind via is related to a resonance frequency of the blind via, and a larger depth of the blind via indicates a lower resonance frequency. As shown in FIG. 2, if two blind vias R1 and R2 with a same depth are provided in the dielectric body, resonance frequencies of the two blind vias R1 and R2 are the same. An external signal wave enters R1, is transmitted to R2 through R1, and then is transmitted to another device through R2. Because the resonance frequencies of R1 and R2 are the same, R1 and R2 do not generate any electric coupling, and therefore, cannot filter a signal wave.

For example, when a signal wave is transmitted from the outside to R1, a transmission direction of the signal wave is clockwise. Because no electric coupling is generated between R1 and R2, the signal wave transmitted to R1 is transmitted to R2 in a spatial transmission manner, that is, a transmission direction of the signal wave transmitted to R2 is also clockwise.

In a possible implementation, the external signal wave is transmitted to R1 through a contact line inserted into R1. Similarly, the signal wave entering R2 is transmitted to another device through a contact line inserted into R2. It should be understood that a manner in the following embodiment in which an external signal wave is transmitted to R1 and is transmitted to another device through R2 may be the same as or different from this manner. This is not limited in this embodiment of this application.

To enable an electric coupling to be generated between R1 and R2 to filter a signal wave, as shown in FIG. 1, in a conventional technology, a blind via R3 with a lower resonance frequency is provided between R1 and R2 to implement the electric coupling between R1 and R2 by using a polarity reversal principle. With reference to FIG. 3 to FIG. 6, the following describes a principle of the electric coupling between R1 and R2 shown in FIG. 1.

FIG. 3 is an equivalent circuit diagram showing that R3 is disposed between R1 and R2 shown in FIG. 1. FIG. 4 is an equivalent circuit diagram showing that a resonance frequency of R3 is greater than resonance frequencies of R1 and R2. FIG. 5 is an equivalent circuit diagram showing that a resonance frequency of R3 is less than resonance frequencies of R1 and R2. FIG. 6 is an equivalent circuit diagram corresponding to FIG. 1. As shown in FIG. 3, R3 is disposed between R1 and R2, which is equivalent to connecting an inductor and a capacitor in parallel. When a resonance frequency of R3 is greater than resonance frequencies of R1 and R2, as shown in FIG. 4, an inductor is equivalent to an open loop. Correspondingly, disposing R3 between R1 and R2 is equivalent to connecting a capacitor in parallel. Similarly, when the resonance frequency of R3 is less than the resonance frequencies of R1 and R2, as shown in FIG. 5, a capacitor is equivalent to an open loop. Correspondingly, disposing R3 between R1 and R2 is equivalent to connecting a capacitor in parallel.

As shown in FIG. 6, in a conventional technology, when R3 with a lower resonance frequency is disposed between R1 and R2, it is equivalent to connecting a capacitor between R1 and R2, that is, equivalent to connecting an inductor between R1 and R2 in series. In view of a magnetic coupling between blind vias R1 and R2, R1 and R2 are equivalent to two inductors connected in series. Based on this, R3 with a lower resonance frequency is disposed between R1 and R2. This is equivalent to three inductors connected in series. Generally, a phase of a signal wave positively shifts 90 degrees after the signal wave passes through an inductor. Correspondingly, when the signal wave enters the filter shown in FIG. 1 from outside, it is equivalent to that the signal wave passes through three inductors and the phase of the signal wave positively shifts 270 degrees, that is, negatively shifts 90 degrees. In this way, an electric coupling is implemented for filtering.

Correspondingly, FIG. 7 is a top view of the dielectric filter corresponding to FIG. 1. As shown in FIG. 7, when a signal wave is transmitted from the outside to R1, a transmission direction of the signal wave is clockwise. An electric coupling is generated between R1 and R2 due to R3 with a lower resonance frequency, in other words, a transmission direction of the signal wave transmitted to R2 changes. As shown in FIG. 7, the transmission direction of the signal wave transmitted to R2 changes into a counterclockwise direction.

It should be understood that strength of the electric coupling between R1 and R2 in a conventional technology depends on a depth of R3. When the depth of R3 is greater than depths of R1 and R2, the electric coupling can be implemented. If a weak electric coupling between R1 and R2 needs to be implemented, the depth of R3 needs to be larger. First, due to a material of the dielectric body, when the electric coupling between R1 and R2 needs to be implemented, through holes with different depths are usually provided in the dielectric body in a dry pressing molding manner, and modeling processing is difficult to implement. In addition, if a weak coupling is to be implemented, the depth of R3 needs to be larger. In this case, a difference between the depth of R3 and the depths of R1 and R2 are large, and the dry pressing modeling causes an uneven density and poor consistency of mass production, thereby affecting the first pass yield. In addition, in the conventional technology, a parasitic resonance effect is generated when an electric coupling is implemented, thereby affecting low band suppression of a passband. Especially, when the filter has a plurality of structures shown in FIG. 1, the low band suppression is obviously weakened. Consequently, the filter cannot satisfy an actual requirement.

To resolve the foregoing problem, the embodiments of this application provide a dielectric filter. A through hole is provided between two blind vias in a dielectric body. The through hole can enable a signal wave entering the through hole to generate a negative 180-degree phase shift, that is, can enable a phase of the signal wave entering the through hole to change from positive 90 degrees into negative 90 degrees, so that an electric coupling is generated between the two blind vias to filter a signal wave.

It should be understood that the electric coupling in the embodiments of this application may also be referred to as a negative coupling or a capacitor coupling.

With reference to specific embodiments, the following describes in detail a structure of the filter provided in the embodiments of this application. The following several embodiments may be combined with each other, and a same or similar concept or process may not be described again in some embodiments.

FIG. 8 is a first top view of a dielectric filter according to an embodiment of this application. FIG. 9 is a second top view of a dielectric filter according to an embodiment of this application. As shown in FIG. 8, the dielectric filter in this embodiment of this application includes: a dielectric body 10, a first blind via R1 and a second blind via R2 that are provided in the dielectric body 10, a through hole H located between the first blind via R1 and the second blind via R2, and an insulating portion I.

Optionally, the dielectric body in this embodiment of this application may be ceramic.

That the through hole H is provided between the first blind via R1 and the second blind via R2 means that a central position of the through hole H may be provided as shown in FIG. 8, and is provided on a same line as a central position of the first blind via R1 and a central position of the second blind via R2; or may be provided as shown in FIG. 9, and is provided not on a same line as a central position of the first blind via R1 and a central position of the second blind via R2. In this embodiment of this application, the through hole H is provided between the first blind via R1 and the second blind via R2, but a relative positional relationship between the through hole H and the first blind via R1 or the second blind via R2 is not specifically limited. It should be understood that in this embodiment of this application, to distinguish between the through hole H and the blind vias, different lines are used for representation. In this embodiment of this application, a dashed line area in the dielectric body represents the through hole H, and solid line areas represent the blind vias.

In this embodiment of this application, inner walls of the first blind via R1, the second blind via R2, and the through hole H each are covered with a metal layer, and an outer surface of the dielectric body is covered with a metal layer. It should be understood that in FIG. 8, the first blind via R1, the second blind via R2, and the through hole H are shown in dark gray to indicate that metal layers are covered on the inner walls thereof. It should be understood that the outer surface of the dielectric body in this embodiment of this application is also covered with the metal layer, in other words, all portions of the dielectric body communicated with the outside (for example, the outer surface, and the inner walls of the first blind via R1, the second blind via R2, and the through hole H) in this embodiment of this application may be covered with metal layers to transmit signal waves. For a manner of covering the metal layer on the inner walls of the first blind via R1, the second blind via R2, and the through hole H, and the outer surface of the dielectric body in this embodiment of this application, refer to a manner of covering a metal layer in a conventional technology. Details are not described herein.

It may be understood that to clearly indicate the dielectric body, the first blind via R1, the second blind via R2, and the through hole H, the outer surface of the dielectric body has not been represented by dark gray in the accompanying drawings in the embodiments of this application.

It should be noted that the dielectric filter in this embodiment of this application further includes the insulating portion I. The insulating portion I may be implemented by not covering a metal layer on a surface of the dielectric body. For example, a metal layer may not be covered on the outer surface or an inner surface (for example, the inner wall of the through hole H) of the dielectric body to form the insulating portion I. It should be understood that because the insulating portion I is not covered with a metal layer, the area that is not in dark gray in FIG. 8 is represented by using dashed lines.

The insulating portion I partially surrounds the through hole H. It should be understood that in this embodiment of this application, that the insulating portion I partially surrounds the through hole H means that the insulating portion I does not completely surround the through hole H. Optionally, the insulating portion I in this embodiment of this application may be in a square circular shape as shown in FIG. 8, a circular shape as shown in FIG. 9, or another shape that can partially surround the through hole H. The shape of the insulating portion I is not limited in this embodiment of this application.

It should be understood that in this embodiment of this application, the insulating portion I partially surrounds the through hole H, so that a signal wave entering the first blind via R1 generates a negative 90-degree phase shift when passing through the through hole H, to be transmitted to the second blind via R2. In other words, the insulating portion I partially surrounds the through hole H, so that the signal wave entering the through hole H can be transmitted to the second blind via R2 after generating a negative 90-degree phase shift.

For example, as shown in FIG. 8 and FIG. 9, if a signal wave is transmitted from the outside to R1, a transmission direction of the signal wave is clockwise, and the signal wave is transmitted to the second blind via R2 after generating a negative 90-degree phase shift after passing through the through hole H. A transmission direction of the signal wave transmitted to R2 and shown in FIG. 8 and FIG. 9 changes into counterclockwise.

Optionally, in this embodiment of this application, an opening of the first blind via R1 and an opening of the second blind via R2 both may be located on a first plane of the dielectric body. Correspondingly, a first opening of the through hole H may be located on the first plane of the dielectric body, and a second opening of the through hole H may be located on a second plane of the dielectric body. The first plane and the second plane are disposed oppositely.

Optionally, an opening of the first blind via R1 and an opening of the second blind via R2 may be located on different planes of the dielectric body. Correspondingly, a first opening of the through hole H and the opening of the first blind via R1 may be located on a same plane, and a second opening of the through hole H and the opening of the second blind via R2 may be located on a same plane.

Optionally, in this embodiment of this application, an opening of the first blind via R1, an opening of the second blind via R2, a first opening of the through hole H, and a second opening of the through hole H may alternatively be provided on different planes of the dielectric body in another manner. It should be understood that "plane" in the first plane, the second plane, the same plane, or different planes is an outer surface of the dielectric body. It should be understood that in the following embodiments, an example in which the opening of the first blind via R1 and the opening of the second blind via R2 are both located on the first plane of the dielectric body, the first opening of the through hole H is located on the first plane of the dielectric body, the second opening of the through hole H may be located on the second plane of the dielectric body, and the first plane and the second plane are disposed oppositely is used for description.

FIG. 10 is a first schematic diagram of a structure of a dielectric filter according to an embodiment of this application. As shown in FIG. 10, in a possible implementation, a through hole H may be an inclined cylinder through hole H shown in FIG. 10, an insulating portion I may be provided on an outer surface of a dielectric body (for example, a lower surface of the dielectric body) and is implemented by not covering a metal layer, and the insulating portion I surrounds a projection of an opening 1 of the inclined cylinder through hole H on a surface of the dielectric body. That is, a projection of the insulating portion I on a surface on which the opening 1 of the inclined cylinder through hole H is located surrounds the opening 1 of the inclined cylinder through hole H. It should be understood that in this application, the insulating portion I is represented by using a dashed line box.

Figure 11:
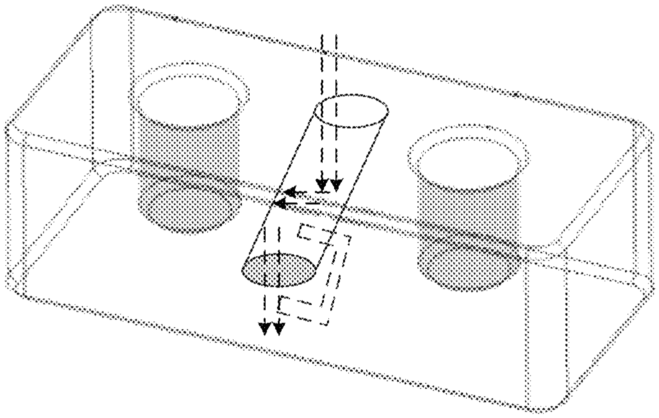
FIG. 11 is a schematic diagram of transmission of a signal wave in a through hole shown in FIG. 10.

FIG. 11 is a schematic diagram of transmission of a signal wave in the through hole shown in FIG. 10. In this scenario, as shown in FIG. 11, when a signal wave entering the first blind via R1 is transmitted to the through hole H, because the through hole H is partially surrounded by the insulating portion I, transmission of the signal wave entering the through hole H in the through hole H may be in a "Z" shape as shown in FIG. 11, to be specific, when the signal wave entering the first blind via R1 passes through the through hole H, a phase of the signal wave negatively shifts for 90 degrees, and the signal wave is transmitted to the second blind via R2. That is, an electric coupling of the dielectric filter shown in FIG. 10 can be implemented.

Figure 12:
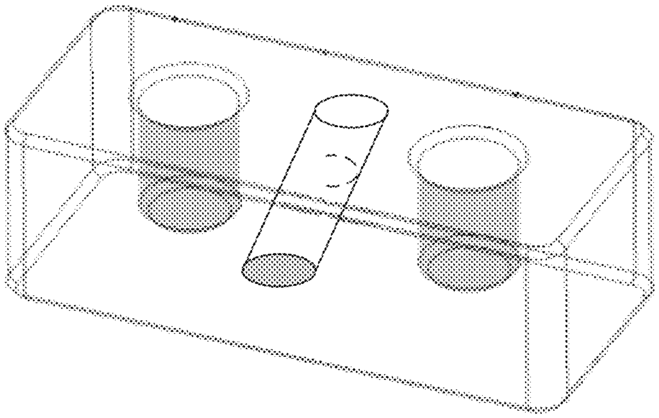
FIG. 12 is a second schematic diagram of a structure of a dielectric filter according to an embodiment of this application.

FIG. 12 is a second schematic diagram of a structure of a dielectric filter according to an embodiment of this application. As shown in FIG. 12, in a possible implementation, a through hole H may be an inclined cylinder through hole H shown in FIG. 10, an insulating portion I may be provided on an inner surface of a dielectric body (for example, an inner wall of the through hole H) and is implemented by not covering a metal layer, and the insulating portion I surrounds a projection of an opening 1 of the inclined cylinder through hole H on a surface of the dielectric body. Similarly, when a signal wave entering the first blind via R1 is transmitted to the through hole H, because the through hole H is partially surrounded by the insulating portion I, transmission of the signal wave entering the through hole H in the through hole H may also be in a "Z" shape as shown in FIG. 11, to be specific, when the signal wave entering the first blind via R1 passes through the through hole H, a phase of the signal wave negatively shifts for 90 degrees, and the signal wave is transmitted to the second blind via R2. That is, an electric coupling of the dielectric filter shown in FIG. 12 can be implemented.

The dielectric filter provided in the embodiments of this application includes: a dielectric body, a first blind via and a second blind via that are provided in the dielectric body, a through hole located between the first blind via and the second blind via, and an insulating portion, where inner walls of the first blind via, the second blind via, and the through hole each are covered with a metal layer, and an outer surface of the dielectric body is covered with a metal layer; and the insulating portion is implemented by not covering a metal layer on a surface of the dielectric body, and the insulating portion partially surrounds the through hole. In the dielectric filter in this embodiment of this application, because a through hole is provided between the first blind via and the second blind via and the insulating portion partially surrounds the through hole, when a signal wave entering the first blind via passes through the through hole, a phase of the signal wave negatively shifts for 90 degrees, and the signal wave is transmitted to the second blind via, so that an electric coupling of the dielectric filter is implemented. In addition, in such a manner of implementing the electric coupling, because a through hole is provided between the first blind via and the second blind via, modeling processing complexity is reduced. Moreover, such an electric coupling manner does not have a parasitic resonance effect and does not affect low band suppression.

On the basis of the foregoing embodiments, a structure of the through hole H and an arrangement manner of the insulating portion I in the embodiments of this application are described in detail with reference to the following embodiments.

In the dielectric filter provided in the embodiments of this application, an opening of the first blind via R1, an opening of the second blind via R2, and a first opening of the through hole H are all provided on a first plane of the dielectric body, a second opening of the through hole H is provided on a second plane of the dielectric body, and the first plane and the second plane are disposed oppositely.

Such an arrangement manner can facilitate modeling processing of the dielectric filter, facilitate arrangement of the insulating portion I, and facilitate a plurality of implementations of the through hole H.

In a possible implementation, the through hole H includes a first through hole portion H1 and a second through hole portion H2 that are communicated, in other words, the through hole H is implemented two through hole H portions that are communicated with each other. An aperture of the first through hole portion H1 is less than an aperture of the second through hole portion H2.

In any possible arrangement scenario of the opening of the first blind via R1, the opening of the second blind via R2, and the opening (the first opening and the second opening) of the through hole H, in the embodiments of this application, the first opening of the first through hole portion H1 is the first opening of the through hole H, the second opening of the second through hole portion H2 is the second opening of the through hole H, and the first through hole portion H1 is communicated with the second through hole portion H2 through the second opening of the first through hole portion H1 and the first opening of the second through hole portion H2. The first opening of the through hole H is provided on the first plane of the dielectric body, the second opening of the through hole H is provided on the second plane of the dielectric body, and the first plane and the second plane are disposed oppositely.

Optionally, the first through hole portion H1 and the second through hole portion H2 may be cylindrical, the first through hole portion H1 and the second through hole portion H2 may be elongated, the first through hole portion H1 may be cylindrical and the second through hole portion H2 may be elongated, the first through hole portion H1 may be elongated and the second through hole portion H2 may be cylindrical, or the first through hole H and the second through hole H may be set to other shapes. It should be understood that in the following embodiment, an example in which the first through hole portion H1 is cylindrical and the second through hole portion H2 is elongated is used to describe the dielectric filter in the embodiments of this application.

Figure 13:
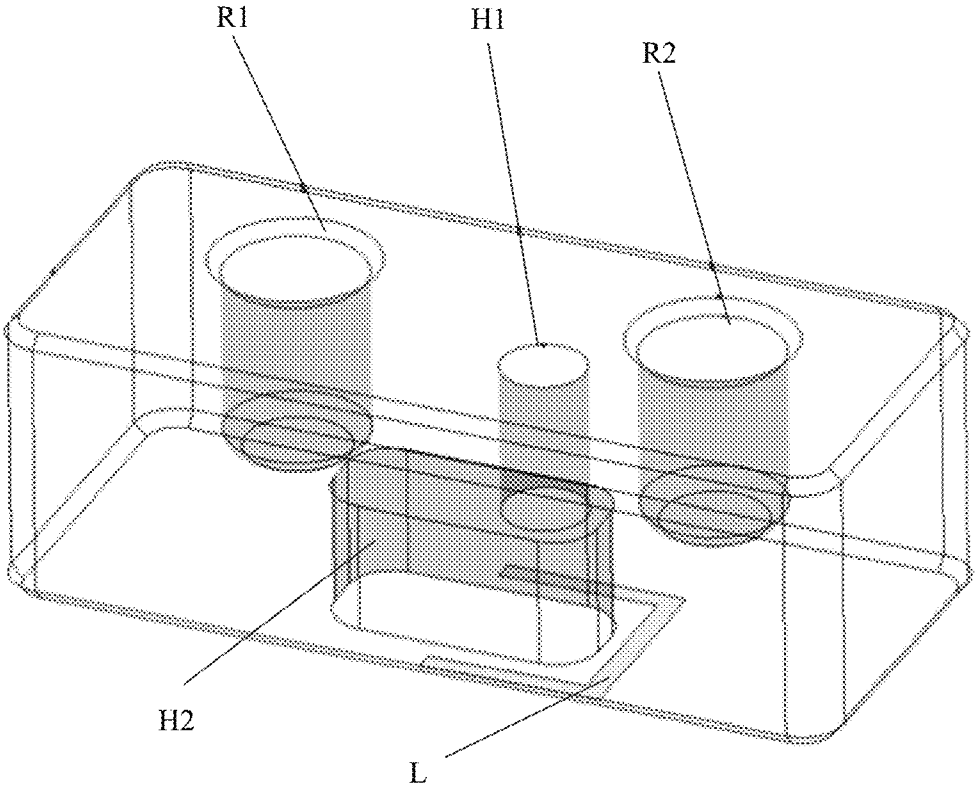
FIG. 13 is a third schematic diagram of a structure of a dielectric filter according to an embodiment of this application.

FIG. 13 is a third schematic diagram of a structure of a dielectric filter according to an embodiment of this application. As shown in FIG. 13, a through hole H provided between a first blind via R1 and a second blind via R2 includes two through hole portions that are communicated, which are a cylindrical first through hole portion H1 and an elongated second through hole portion H2. In this embodiment of this application, a first opening of the cylindrical through hole portion is provided on a first plane of a dielectric body, a second opening of the elongated through hole portion is provided on a second plane of the dielectric body, and the cylindrical through hole portion is communicated with the elongated through hole portion through a second opening of the cylindrical through hole portion and a first opening of the elongated through hole portion.

In this scenario, an insulating portion I may partially surround the second through hole portion H2, so that a signal wave entering the first blind via R1 generates a negative 90-degree phase shift when passing through the through hole H (including the first through hole portion H1 and the second through hole portion H2), to be transmitted to the second blind via R2, thereby implementing an electric coupling.

On the basis of FIG. 13, the following describes an arrangement manner of the insulating portion I.

In a possible implementation, as shown in FIG. 13, the insulating portion I may be provided on the second plane and partially surrounds the second opening of the second through hole portion H2.

In this scenario, in a possible implementation, as shown in FIG. 13, there may be a distance between the insulating portion I and the second through hole portion H2 to facilitate modeling processing of the dielectric filter. It should be understood that to the insulating ring is painted gray to embody the insulating ring, but it should be noted that the insulating ring is not covered with a metal layer.

In this scenario, in a possible implementation, an edge of the insulating portion I may coincide with an edge of the second through hole portion H2, that is, the edge of the insulating portion I may coincide with an edge of the second opening of the second through hole portion H2.

Figure 14:
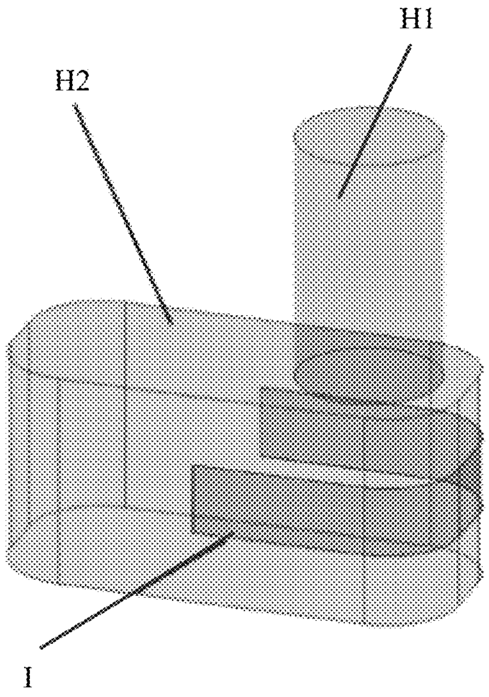
FIG. 14 is a fourth schematic diagram of a structure of a dielectric filter according to an embodiment of this application.

In a possible implementation, FIG. 14 is a fourth schematic diagram of a structure of a dielectric filter according to an embodiment of this application. As shown in FIG. 14, an insulating portion I is provided on an inner wall of a second through hole portion H2. It should be understood that FIG. 14 shows merely the insulating portion I and a through hole H.

Figure 15:
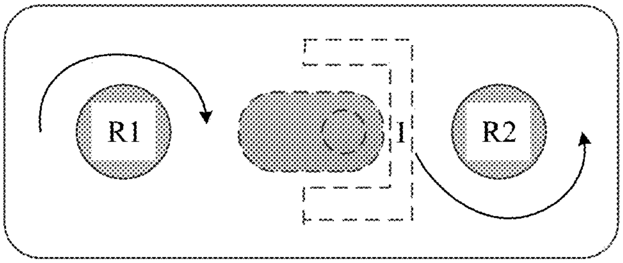
FIG. 15 is a top view corresponding to the dielectric filter in FIG. 13.

It should be noted that in a scenario in which the through hole H includes the first through hole portion H1 and the second through hole portion H2, in a possible implementation, a projection of the first opening of the first through hole portion H1 on the second plane is at a non-central position of the second opening of the second through hole portion H2, as shown in FIG. 13 and FIG. 14. FIG. 15 is a top view corresponding to the dielectric filter in FIG. 13.

Figure 16:
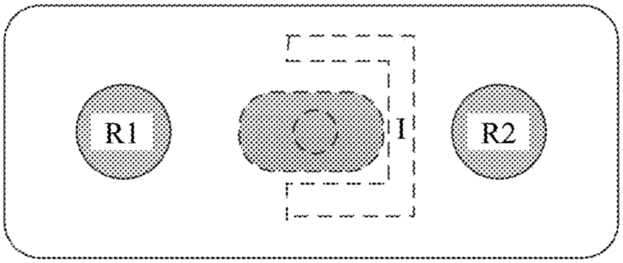
FIG. 16 is a top view of a dielectric filter according to an embodiment of this application.

In a possible implementation, a projection of the first opening of the first through hole portion H1 on the second plane is at a central position of the second opening of the second through hole portion H2. FIG. 16 is a top view of a dielectric filter according to an embodiment of this application. It should be understood that as shown in FIG. 16, a first through hole portion H1 is cylindrical, and a second through hole portion H2 is elongated. As shown in FIG. 16, a projection of a center of a first opening of the cylindrical through hole portion on a second plane is at a central position of a second opening of the second through hole portion H2.

It should be noted that in this embodiment of this application, an insulating portion I surrounds the projection of the first opening of the first through hole portion H1 on the second plane. It should be understood that in a scenario in which the through hole H includes the first through hole portion H1 and the second through hole portion H2, for example, in the scenarios shown in FIG. 13 and FIG. 14, the insulating portion I needs to surround the projection of the first opening of the first through hole portion H1 on the second plane. That is, in the embodiments of this application, regardless of whether the projection of the first through hole portion H1 on the second plane is at the central position of the second opening of the second through hole portion H2 and whether the insulating ring is disposed on the second plane or the inner wall of the second through hole portion H2, the insulating portion I needs to surround the projection of the first opening of the first through hole portion H1 on the second plane to implement an electric coupling of the dielectric filter.

Figure 17:
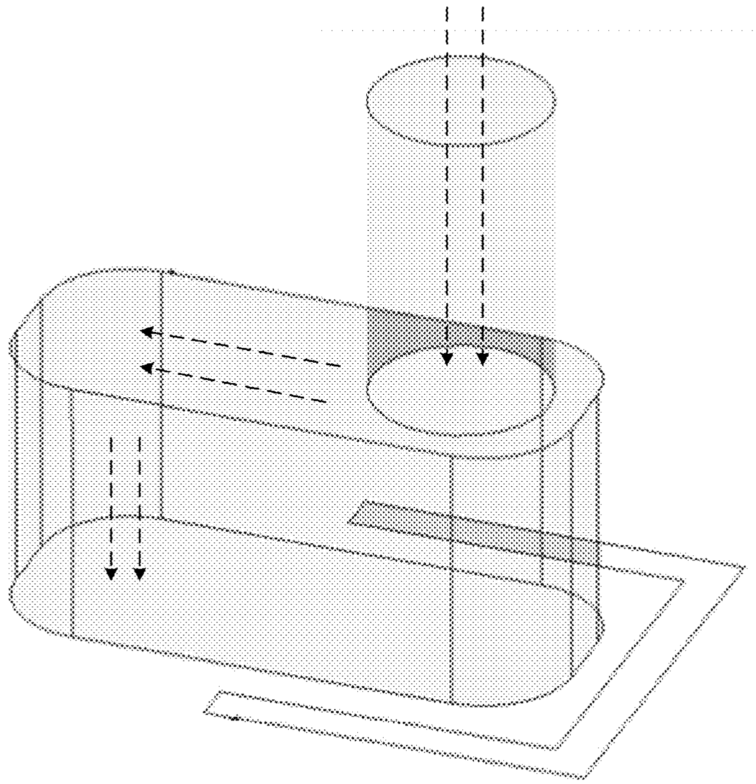
FIG. 17 is a schematic diagram of transmission of a signal wave passing through a through hole in FIG. 13.

With reference to FIG. 17, the following describes a principle of implementing the electric coupling of the dielectric filter when the through hole H includes the first through hole portion H1 and the second through hole portion H2. FIG. 17 is a schematic diagram of transmission of a signal wave passing through the through hole in FIG. 13. As shown in FIG. 17, the signal wave transmitted to the through hole H may be transmitted downward through the first opening of the first through hole portion H1. Because the insulating ring surrounds the projection of the first opening of the first through hole portion H1 on the second plane, the signal wave is not directly transmitted downward, but is transmitted leftward after generating a negative 90-degree phase shift, and then is transmitted downward. Based on this, the signal wave generates a negative 90-degree phase shift when passing through the through hole H, to implement the electric coupling.

Correspondingly, as shown in FIG. 15, if a signal wave is transmitted from the outside to R1, a transmission direction of the signal wave is clockwise, and the signal wave is transmitted to the second blind via R2 after generating a negative 90-degree phase shift after passing through the through hole H. A transmission direction of the signal wave transmitted to R2 and shown in FIG. 15 changes into counterclockwise.

It should be noted that in the embodiments of this application, the electric coupling of the dielectric filter may further be implemented in at least one of the following manners:

1. Adjust a ratio of a depth of the first through hole portion H1 to a depth of the second through hole portion H2.
2. Adjust a length of the insulating portion I.
3. Adjust a width of the insulating ring.

In the dielectric filter provided in this embodiment of this application, the through hole provided between the first blind via and the second blind via includes a first through hole portion and a second through hole portion that are communicated, and an aperture of the first through hole portion is less than an aperture of the second through hole portion. Relative positions of the first through hole portion and the second through hole portion may be: A projection of a first opening of the first through hole portion on a second plane is at a central position of a second opening of the second through hole portion, or a projection of a first opening of the first through hole portion on a second plane is at a non-central position of a second opening of the second through hole portion. Correspondingly, the insulating portion may be provided on the second plane of a dielectric body and surrounds the second opening of the second through hole portion, or may be provided on an inner wall of the second through hole portion. It should be understood that regardless of relative positions of the first through hole portion and the second through hole portion and arrangement of the insulating portion, the insulating portion needs to surround the projection of the first opening of the first through hole portion on the second plane to implement the electric coupling.

Figure 18:
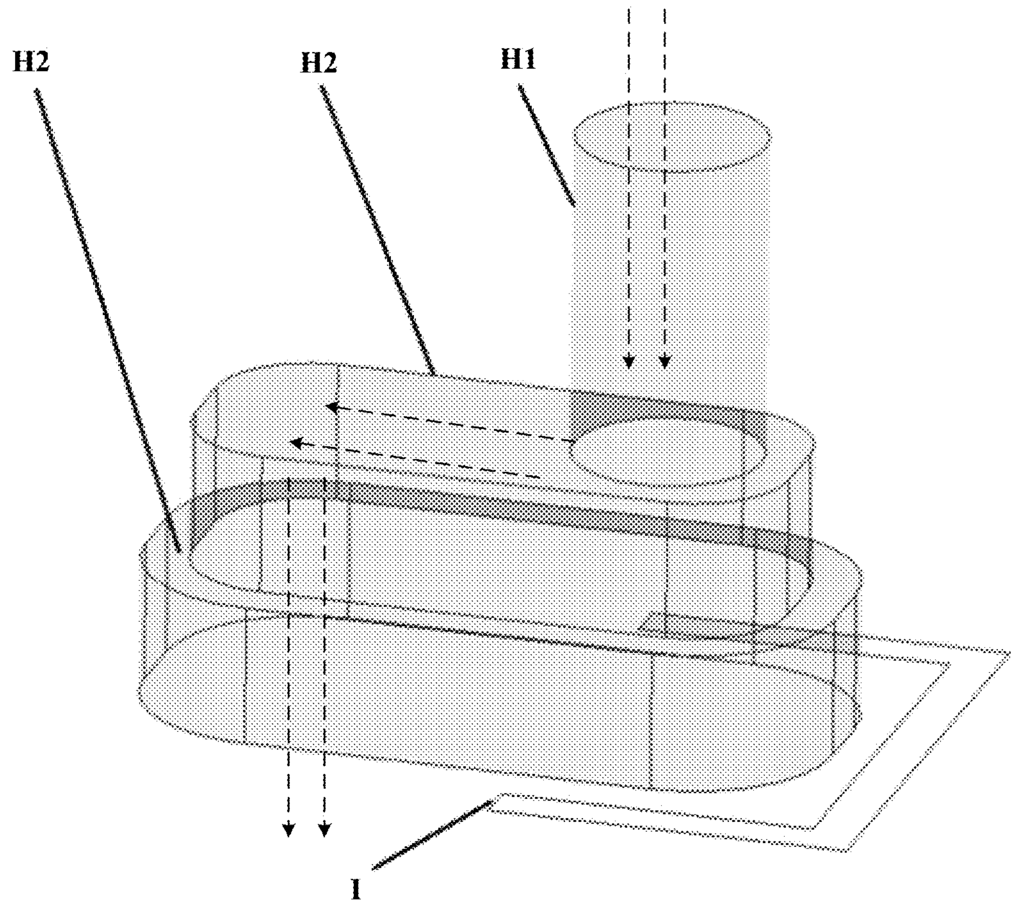
FIG. 18 is a schematic diagram of arrangement of a through hole and an insulating portion in a dielectric filter according to an embodiment of this application.

In the structure of the dielectric filter in the foregoing embodiment, there is one second through hole portion H2. With reference to FIG. 18, a structure of a dielectric filter with a plurality of second through hole portions H2 is described in the following embodiment. It should be understood that to describe arrangement manners of a through hole H and an insulating portion I in the dielectric filter more clearly, FIG. 18 shows merely the through hole H and the insulating portion I in the dielectric filter.

FIG. 18 is a schematic diagram of arrangement of a through hole and an insulating portion in a dielectric filter according to an embodiment of this application. As shown in FIG. 18, there are at least two second through hole portions H2, and apertures of the second through hole portions H2 sequentially increase in a direction away from the first through hole portion H1.

As shown in FIG. 18, there are two second through hole portions H2, and the apertures of the second through hole portions H2 sequentially increase in a direction away from the first through hole portion H1.

In the scenario shown in FIG. 18, in a possible implementation, the insulating portion I may be provided on a second plane of a dielectric body, and the insulating portion I partially surrounds a second through hole portion H2 with a largest aperture. As shown in FIG. 18, the insulating portion I is provided on the second plane of the dielectric body, and the insulating portion I partially surrounds the second through hole portion H2 that has the largest aperture and that is farthest to the first through hole portion H1.

In a possible implementation, the insulating portion I is provided on an inner wall of any second through hole portion H2. For example, the insulating portion I may be provided on an inner wall of a second through hole portion H2 at a middle position. For an arrangement manner of the insulating portion I on an inner wall of any second through hole portion H2, refer to the related description and the arrangement manner of the insulating portion I, in the embodiment shown in FIG. 14, provided on the inner wall of the second through hole portion H2.

In a possible implementation, there are a plurality of insulating portions I, each insulating portion I partially surrounds one second through hole portion H2, and the insulating portion I may be provided on an inner wall of the second through hole portion H2. Each insulating portion I may have a same or a different length or width, but surrounds a projection of a first opening of the first through hole portion H1 on the second plane. It should be understood that in this scenario, merely the insulating portion I close to the first through hole portion H1 functions.

It should be noted that in this embodiment of this application, relative positions of the first through hole portion H1 and the second through hole portion H2 may be: A projection of a first opening of the first through hole portion H1 on a second plane is at a central position of a second opening of the second through hole portion H2, or a projection of a first opening of the first through hole portion H1 on a second plane is at a non-central position of a second opening of the second through hole portion H2. It should be understood that regardless of relative positions of the first through hole portion H1 and the second through hole portion H2 and arrangement of the insulating portion I, the insulating portion I needs to surround the projection of the first opening of the first through hole portion H1 on the second plane to implement the electric coupling.

In the foregoing scenario, FIG. 18 shows an example of transmission of the signal wave. A principle of the example of the transmission of the signal wave is similar to that of FIG. 17. The signal wave transmitted to the through hole H may be transmitted downward through the first opening of the first through hole portion H1. Because the insulating ring surrounds the projection of the first opening of the first through hole portion H1 on the second plane, the signal wave is not directly transmitted downward, but is transmitted leftward after generating a negative 90-degree phase shift, and then is transmitted downward. Based on this, the signal wave generates a negative 90-degree phase shift when passing through the through hole H, to implement the electric coupling.

In this embodiment of this application, there may be at least two second through hole portions in the dielectric filter, and apertures of the second through hole portions sequentially increase in a direction away from the first through hole portion. In this scenario, the insulating portion may be provided on the second plane and the insulating portion partially surrounds a second through hole portion with a largest aperture, or the insulating portion is provided on an inner wall of any second through hole portion, or an inner wall of each second through hole portion is provided with one insulating portion. It should be understood that regardless of relative positions of the first through hole portion and the second through hole portion and arrangement of the insulating portion, the insulating portion needs to surround the projection of the first opening of the first through hole portion on the second plane to implement the electric coupling.

An embodiment of this application further provides a communication device. The communication device includes the dielectric filter described in the foregoing embodiment. It should be understood that the communication device provided in this embodiment of this application can implement the same technical effect as the dielectric filter. For details, refer to the related description of the foregoing embodiment. Details are not described herein again. Optionally, the communication device may be a base station or a transceiver.

What is claimed is:

1. A dielectric filter, comprising:

a dielectric body;

a first blind via and a second blind via wherein the first blind via and the second blind via are provided in the dielectric body;

a through hole located between the first blind via and the second blind via; and an insulating portion, wherein inner walls of the first blind via, the second blind via, and the through hole each are covered with a metal layer, and an outer surface of the dielectric body is covered with a metal layer; and the insulating portion is implemented by not covering a metal layer on a surface of the dielectric body;

the through hole comprises a first through hole portion and a second through hole portion that are in communication, and an aperture of the first through hole portion is less than an aperture of the second through hole portion; and a first opening of the first through hole portion is the first opening of the through hole, a second opening of the second through hole portion is the second opening of the through hole, the first through hole portion is in communication with the second through hole portion through a second opening of the first through hole portion and a first opening of the second through hole portion, the first opening of the through hole is provided on a first plane of the dielectric body, the second opening of the through hole is provided on a second plane of the dielectric body, and the first plane and the second plane are disposed oppositely;

the insulating portion is provided on the second plane and partially surrounds the second through hole portion;

a projection of the first opening of the first through hole portion on the second plane is at a non-central position of the second opening of the second through hole portion;

wherein the first through hole portion is cylindrical, and the second through hole portion has an elongated cross-section that has at least one linear side.

2. The dielectric filter according to claim 1, wherein an opening of the first blind via, an opening of the second blind via, and the first opening of the through hole are each provided on the first plane of the dielectric body.

3. The dielectric filter according to claim 1, wherein an edge of the insulating portion coincides with an edge of the second through hole portion.

4. The dielectric filter according to claim 1, wherein the dielectric body is ceramic.

5. The dielectric filter according to claim 1, wherein the insulating portion is located between the second blind via and the second through hole portion, and the insulating portion surrounds on the right of the through hole.

* * * * *